Patented June 10, 1952

2,600,166

UNITED STATES PATENT OFFICE 2,600,166

PURIFICATION OF ORGANIC ACIDS

William B. Hughes, Barnsdall, Okla., assignor to Cities Service Oil Company, Bartlesville, Okla., a corporation of Delaware Application February 9, 1949, Serial No. 75,495

5 Claims. (Cl. 202—57)

This invention relates to the purification of organic acids and more particularly to the purification of acids containing carbonyl impurities.

In processes yielding significant quantities of organic acids, such as the various modifications of the Fischer-Tropsch process, the acids recovered are generally contaminated with carbonyl impurities boiling in the same range as the desired acids, and which are very difficult to remove by physical or chemical means. Such acids are not suitable for use in processes in which a pure acid is necessary, and consequently bring a much lower price on the market than a highly purified acid. Various chemical and physical processes for the removal of such carbonyl impurities have heretofore been proposed, but such processes, while effecting a good cleanup of lower acids such as acetic and propionic, are usually not capable of effecting a complete removal of carbonyls from butyric and higher acids.

It is an object of this invention to provide a process for the removal of substantially all of the carbonyl impurities from impure mixtures of organic acids.

In general, my process consists in treating the acids to be purified with a lead compound, among which I have found the most satisfactory to be lead tetraacetate and red lead. I have found that artificially contaminated acids containing substantial quantities of carbonyls may be thus purified down to a trace value of carbonyls, and that synthetically produced acids which generally contain about 0.5 per cent carbonyl impurities, may be purified to such an extent that no carbonyls can be detected in the final product by the usual qualitative tests. Where the acids to be purified do not contain acetic acid, it may be necessary to employ lead tetraacetate in order to effect a complete cleanup of the carbonyl impurities. However, when the acids to be purified contain acetic acid, I have found that equally good results may be obtained by the use of red lead.

For example, a mixture organic acids composed of 200 grams of acetic acid, 50 grams of propionic acid and 50 grams of butyric acid containing 4.5 weight per cent of ketones calculated as methyl ethyl ketone and composed of about one-third methyl ethyl ketone, one-third diethyl ketone, and one-third diisopropyl ketone was heated to 80° C. and five grams of red lead were added while the mixture was vigorously stirred. The oxide was added in 0.5 to 1.0 gram portions, allowing time for the red color to disappear between additions. When all the oxide had been added, the stirring was discontinued, the temperature raised to boiling, and the mixture refluxed gently for two hours, then fractionated to take overhead the acid content of the mixture. The final carbonyl content was approximately 0.6 per cent by weight calculated as methyl ethyl ketone, at least part of which is considered to be mechanical contamination. The bottoms from the fractionation consisted essentially of oxidized carbonyls and lead salts.

In other runs to determine the efficacy of my new method of purification of acids the same synthetic mixture as stated above was treated with 20 grams of lead tetraacetate per one hundred grams of charge, with a resultant cleanup of the acids to trace carbonyl values. It was also found that the addition of 10 grams of red lead per one hundred grams of the stock above-described was sufficient to clean up the carbonyl impurities to trace values.

My method is also applicable to the cleanup of acids obtained from the aqueous fraction of a Fischer-Tropsch product. A sample of such acids including acetic, propionic, and butyric acids contaminated by approximately 0.5 per cent carbonyls calculated as methyl ethyl ketone, was treated with four grams of lead tetraacetate. After fractionation of the acids from the reaction mixture it was found that the acids contained no carbonyl impurities and compared favorably with acids of the reagent grade. Other portions of carbonyl-contaminated acids obtained from the Fischer-Tropsch synthesis were treated with as little as two grams of red lead per one hundred grams of anhydrous acids, this treatment also resulting in a 100 per cent clean-up of the carbonyl impurities.

The bottoms from the fractionation may be treated to recover the lead content by heating in an oxidizing atmosphere to drive off the organic components of the bottoms and reconvert the lead salts to red lead, which may then be recycled to the operation.

I have thus discovered a method by which a complete cleanup of carbonyl impurities contained in synthetic acids may be easily obtained. While in the examples above my process has been described in connection with artificially contaminated acid samples and with Fischer-Tropsch acids, my invention is not limited to the purification of such acids, but may be applied to the treatment of carbonyl-contaminated organic acids derived from any source.

Having now described my invention, what I claim as new and useful is:

1. The process of purifying carboxylic acids containing carbonyl impurities including treating carboxylic acids containing carbonyl impurities with lead tetraacetate, fractionating the reaction mixture, and recovering substantially pure acids.

2. The process according to claim 1 in which the reaction is carried out at a temperature of about 80° C.

3. The process of refining carboxylic acids including treating a carbonyl-containing mixture of carboxylic acids including acetic acid, with a reagent selected from the group consisting of red lead and lead tetraacetate, fractionating the reaction mixture and recovering substantially pure acids.

4. The process according to claim 3 in which the reaction is carried out at a temperature of about 80° C.

5. The process according to claim 3 in which the reagent is red lead.

WILLIAM B. HUGHES.

REFERENCES CITED

The following references are of record in the file of this patent:

UNITED STATES PATENTS

| Number | Name | Date |
| --- | --- | --- |
| 2,255,421 | Groll et al. | Sept. 9, 1941 |

FOREIGN PATENTS

| Number | Country | Date |
| --- | --- | --- |
| 4037 of 1874 | Great Britain | Nov. 24, 1874 |